UNITED STATES PATENT OFFICE.

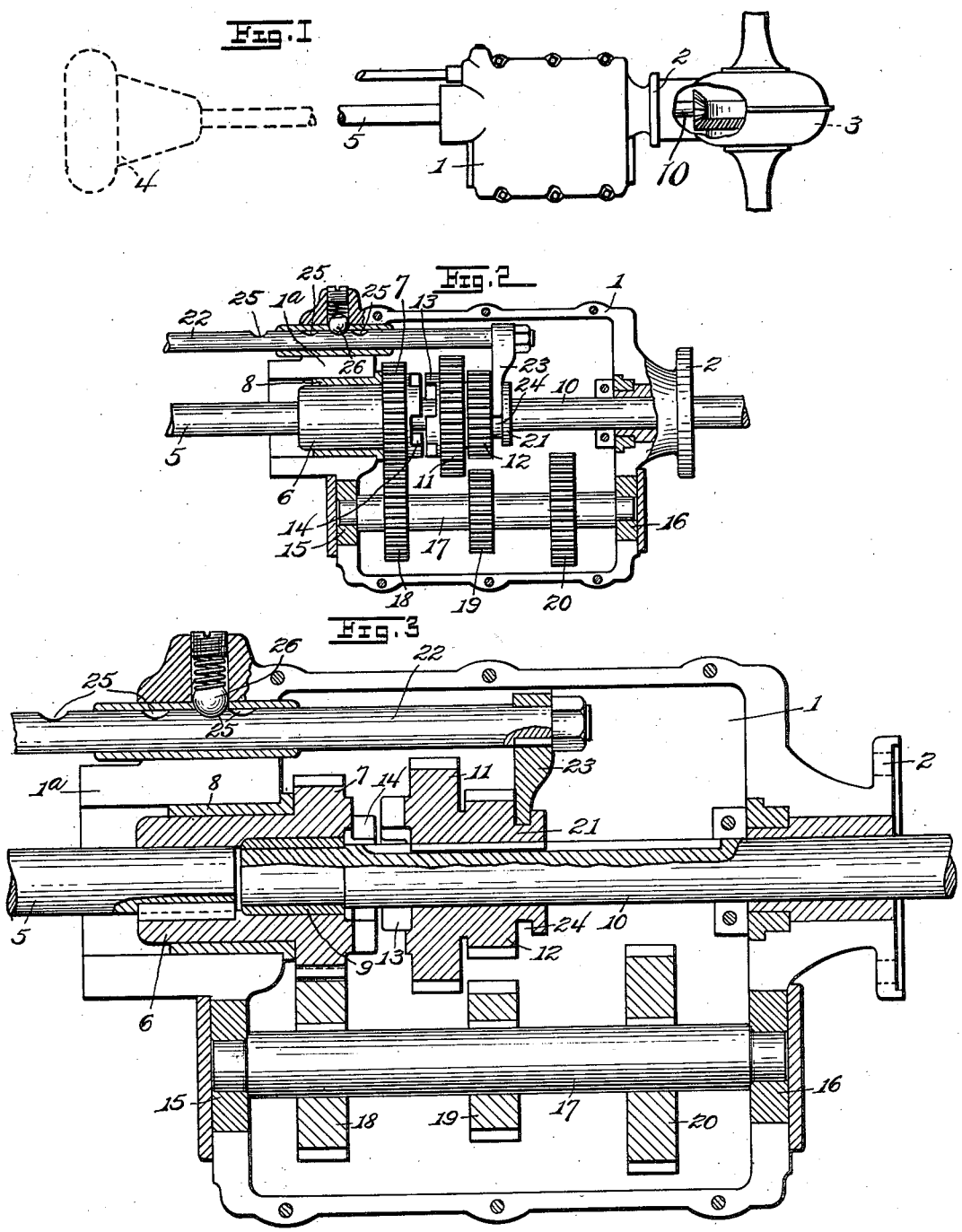

JAMES KRICK AND WILLIAM J. HERVEY, OF FOLLANSBEE, WEST VIRGINIA.

CHANGE-SPEED TRANSMISSION-GEARING.

1,184,107. Specification of Letters Patent. Patented May 23, 1916.

Application filed May 9, 1914. Serial No. 837,401.

*To all whom it may concern:*

Be it known that we, JAMES KRICK and WILLIAM J. HERVEY, citizens of the United States of America, and residents of Follansbee, county of Brooke, and State of West Virginia, have invented certain new and useful Improvements in Change-Speed Transmission-Gearing, of which the following is a specification.

This invention relates broadly to transmission gearing for use in motor vehicles, and specifically to a transmission mechanism which shall be secondary or auxiliary to a primary or main transmission gearing.

The primary object of the invention is to provide a secondary transmission gearing adjunctive to a primary or main gearing whereby various speed changes not obtainable in the latter may be readily obtained.

A further object is to provide a simple and inexpensive transmission gearing which is designed for application to motor vehicles the main or primary transmission of which is capable of but two forward speed changes, whereby two additional speed changes are afforded, one being intermediate the low and high speeds of said main transmission, and the other higher than the high speed of said main transmission.

The invention resides in the features of construction, arrangement of parts and combinations of elements which will hereinafter be fully described, reference being had to the accompanying drawings, forming a part of this specification, in which—

Figure 1 is a view in top plan illustrating the position occupied by my invention applied to the driving mechanism of an automobile of a well-known make, the main transmission casing and differential housing being shown in dotted lines; Fig. 2 is a partial horizontal section of the invention, enlarged, showing the gearing in top plan; and Fig. 3 is a similar view, still further enlarged, showing the gearing in section.

Referring to said drawings, in which like designating characters distinguish like parts throughout the several views—1 indicates the casing within which the gearing constituting the essential feature of my invention is inclosed, said casing having an annular terminal flange 2 at its rear end adapted for bolting to the front end of the usual differential housing 3. Extending rearward from the primary or main transmission gearing inclosed within the casing 4 is the main drive-shaft 5. Said drive-shaft terminates at a suitable point within the casing 1 and has fixed upon its end the front end of a sleeve or long boss 6 which is integral with and extends forward from a gear wheel 7. Said sleeve is rotatably mounted within a bushing 8 provided in a bearing 1ª formed in the front end of said casing.

The gear wheel 7 has seated therein a bushing 9 which has rotatably received therein the front end of a complemental drive-shaft 10 which is axially alined with the drive-shaft 5 and extends rearwardly through the casing 1 and carries upon its rear end the bevel drive pinion (not shown) for the differential gearing. Said shaft 10 has splined thereon and movable longitudinally thereof a shiftable member 21 which has rigidly mounted thereon or formed integral therewith two spur gears 11 and 12 of different sizes. Said shiftable member has formed on its front end a clutch element with teeth 13 which, with forward sliding movement of said member, are carried into and out of operative relation with clutch teeth 14 formed on the rear end of said sleeve 6. When the shiftable member is moved forward, the clutch elements 13 and 14 are brought into active relation so that the rotation of the drive-shaft 5, accomplished through the intermediacy of the gears of the main transmission, is transmitted directly to the complemental drive-shaft 10, and through the latter, to the differential gearing, thus permitting the power through the main transmission gearing to be applied in the usual manner and without any variation of speed from that obtained by the use of the continuous drive-shaft heretofore employed. In other words, when said clutch elements have assumed active relation, the main transmission gearing may be used precisely as ordinarily.

Disposed within the casing 1 parallel to the complemental drive-shaft 10 and having its ends journaled in suitable bearings, as 15 and 16, is a counter-shaft 17 which has fixed thereon at suitable points spur gears 18, 19 and 20. The gear 18 is constantly in mesh with the gear 7, and, consequently, rotation of the shaft 5 produces a constant rotation of said countershaft. The gear 19 is disposed on the countershaft a sufficient distance from said gear 18 that room is afforded therebetween to accommodate the gear 11 both when in the neutral position occupied thereby in the figures of the drawings and when in the forwardly shifted position wherein the clutch elements assume active relation. The gear 11 is adapted, when said shiftable member 21 is moved rearward from said neutral position to the first change-speed position, to assume active relation with the gear 19, whereupon there will be transmitted to the complemental shaft 10, through the gears 7, 18, 19 and 11, a rotation speed intermediate the two speeds which are communicated thereto from the main transmission. A still further rearward movement of the shiftable member results in gears 19 and 11 being disconnected, one from the other, and in the gear 12 being brought into mesh with gear 20, whereupon there will be transmitted to the shaft 10, through the gears 7, 18, 20 and 12, a rotation speed which is higher than that communicated thereto by the highest speed gear of the main transmission.

The shifting device for the shiftable member 21 comprises a longitudinally slidable shift-rod 22 which carries an arm 23 having a bifurcated end operating in an annular groove 24 provided in the member 21 adjacent to the rear end of the latter. For maintaining said shift-rod 22 against chance displacement from its neutral and various operative positions, four sockets 25 are provided therein at appropriate points, said sockets constituting seats for a spring-pressed ball 26.

What is claimed is—

A mechanism of the character described comprising a transmission consisting of a casing, shafts projecting from its opposite ends and transmission gearing within the casing including a shiftable part, a shift rod connected to the shiftable part of the transmission and extending through the forward end of the casing alongside of the projecting shaft, and a differential on the rear shaft having a housing formed with a forward extension through which the shaft passes, the rear end of the casing being formed with a bearing for the rear shaft and a flange surrounding the bearing and adapted to seat on and be secured to the lateral extension of the housing.

In testimony whereof we affix our signatures in presence of two witnesses.

JAMES KRICK.
WILLIAM J. HERVEY.

Witnesses:
W. F. KUFER,
H. E. DUNLAP.